United States Patent [19]

Suzuki et al.

[11] 4,057,264
[45] Nov. 8, 1977

[54] FRONT FORK FOR SUSPENDING A FRONT WHEEL OF A MOTORCYCLE

[76] Inventors: Kensei Suzuki, No.10-1, Terada Tonoji, Inuyama, Aichi; Takashi Sanada, No.1511-4, Imawatari, Kani; Kenzo Okazima, No.2637, Dota, Kani, both of Kani, Gifu, all of Japan

[21] Appl. No.: 599,122

[22] Filed: July 25, 1975

[51] Int. Cl.² .................................. B62K 25/08
[52] U.S. Cl. ........................... 280/276; 188/269; 188/289; 188/314
[58] Field of Search ............... 267/64 R, 65 R; 280/276; 188/319, 282, 299, 314, 286, 289, 269

[56] References Cited

U.S. PATENT DOCUMENTS

| | | | |
|---|---|---|---|
| 1,273,011 | 7/1918 | Snyder | 188/319 |
| 2,117,837 | 5/1938 | Casper | 188/319 |
| 2,182,016 | 12/1939 | Deutsch | 188/319 |
| 2,183,003 | 12/1939 | Becker | 188/314 |
| 2,351,662 | 6/1944 | Christofel | 188/319 |
| 2,360,755 | 10/1944 | Boor | 188/286 |
| 2,394,355 | 2/1946 | Beecher | 188/319 |
| 2,728,419 | 12/1955 | Crabtree | 188/269 |
| 3,079,897 | 3/1963 | Kirsch | 267/64 R |
| 3,677,561 | 7/1972 | McNally | 267/65 R |
| 3,753,578 | 8/1973 | Rupp | 280/276 |
| 3,937,307 | 2/1976 | Kock | 188/319 |

FOREIGN PATENT DOCUMENTS 470,907  4/1952  Italy .................... 188/319

Primary Examiner—Richard A. Bertsch
Assistant Examiner—Jack D. Rubenstein
Attorney, Agent, or Firm—Saul Jecies

[57] ABSTRACT

A front fork for suspending a front wheel of a motorcycle has an outer tube and an inner tube slidably accomodated therein. A pressure chamber is defined between the inner tube and a hollow rod and communicates with a lower chamber formed in the outer tube through a port formed in the inner tube, an anular recess formed in the inner tube, another port formed in the inner tube at the lower portion thereof and a selected one of a plurality of orifices of different diameters formed in a lock piston located in the inner tube. The lock piston is provided with an engaging member engageable with a bottom wall of the outer tube when the inner tube is caused to intrude into the outer tube by a maximum amount. The degree of fluid communication between the port of the inner tube and each of the orifices formed in the lock piston can be varied by rotating the inner tube and outer tube relative to each other while the engaging member is held in engagement with the bottom wall of the outer tube, whereby a damping effect is adjusted and air is prevented from mixing with working oil while production of unusual sounds due to lack of working oil sucked into the lower chamber is prevented.

3 Claims, 5 Drawing Figures

FRONT FORK FOR SUSPENDING A FRONT WHEEL OF A MOTORCYCLE

BACKGROUND OF THE INVENTION

This invention relates in general to a front fork for suspending a front wheel of a motorcycle and, more particularly, to an improvement over the front fork of such a type in which an inner tube is slidably disposed in an outer tube.

Generally, in a front fork for suspending a front wheel of a motorcycle, it is required that a damping effect be freely adjusted to an optimum value at all times in dependence on the differences in the weight of the motorcycle and running conditions of the motorcycle such as, for example, in normal running or racing. Another requirement is that the amount of air-bladders or bubbles to be mixed with working oil be reduced as much as possible in order to stabilize the damping effect. Further, if the working oil is sucked into a lower chamber of the front fork having its volume increased during operation of the front fork in an insufficient amount, vacuum is produced in the lower chamber so that air contained in the working oil is set free therefrom and compressed and smashed at the subsequent stroke of the front fork thereby producing unusual sounds therein. These sounds cause the driver to experience a feeling of unrest and, hence, it is desirable to preclude such an undesirable phenomenon. Nevertheless, no attempts to meet these requirements have been made in the prior art front forks of the type in which the inner tube is slidably disposed in the outer tube, for various reasons. One of these reasons resides in the fact that an orifice for producing a damping effect is formed in a hollow rod extending from the bottom wall of the outer tube into the inner tube and, therefore, it is difficult to change the effective cross-sectional area of the orifice after the front fork has been completely assembled. Another reason is based on the fact that the orifice is necessarily formed in the hollow rod at a position near the air chamber provided in the inner tube due to inherent construction of the front fork by which working oil ejecting from the orifice is apt to be mixed with air in the air chamber. Among other reasons, when the lower chamber of the outer tube is increased in volume during the expanding stroke of the front fork, the working oil is sucked into the lower chamber only through the elongated hollow rod having a small diameter and, thus, it is difficult to prevent the lack of amount of working oil sucked into the lower chamber, due to the inherent construction of the front fork.

SUMMARY OF THE INVENTION

It is therefore an object of the present invention to provide an improved front fork serving as a suspension for a front wheel of a motorcycle which can overcome the shortcomings encountered in the prior art.

In order to achieve this object, the present invention features a flow restriction to provide a damping effect in a lock piston disposed on a lower part of an inner tube while forming an annular passageway in the inner tube at an outer periphery thereof held in sliding contact with the outer tube. The annular passageway extends from a portion opposing the flow restriction toward an upper part of the inner tube and communicates with the lower chamber of the outer tube through a port formed in the inner tube and the flow restriction formed in the lock piston and also communicates with a pressure chamber defined between the inner tube and the hollow rod through another port formed in the inner tube. With this arrangement, when the front fork is in its expansion stroke, working oil is forced out of the pressure chamber through the flow restriction and admitted to the lower chamber of the outer tube which is far away from the air chamber provided in the inner tube at an upper part thereof. Consequently, air is satisfactorily prevented from mixing with the working oil. Since, furthermore, the lower chamber is supplied with working oil ejecting from the pressure chamber through the flow restriction when the lower chamber is increased in volume, and additional working oil is sucked into the lower chamber through the hollow rod in an amount corresponding to a value which lacks in the lower chamber, the working chamber is prevented from lacking in the amount of working oil sucked thereinto even though the hollow rod is relatively elongated and small in diameter.

In addition, the flow restriction formed in the lock piston is comprised of a plurality of orifices having different diameters which are circumferentially spaced from each other, and the lock piston is provided with an engaging member engageable with the bottom wall of the outer tube when the inner tube intrudes into the outer tube by a maximum amount. With this construction, it is possible to cause a selected one of a plurality of orifices to communicate with the port of the inner tube by rotating the inner tube and outer tube relative to each other. Thus, the damping effect of the front fork can be adjusted to an optimum value at all times in dependence on the differences in the weight of the motorcycle and running conditions of the motorcycle.

BRIEF DESCRIPTION OF THE DRAWINGS

These and other objects, features and advantages of the present invention will become more apparent from the following description when taken in conjunction with the accompanying drawings, in which.

DESCRIPTION OF THE PREFERRED EMBODIMENTS

Figure 1:
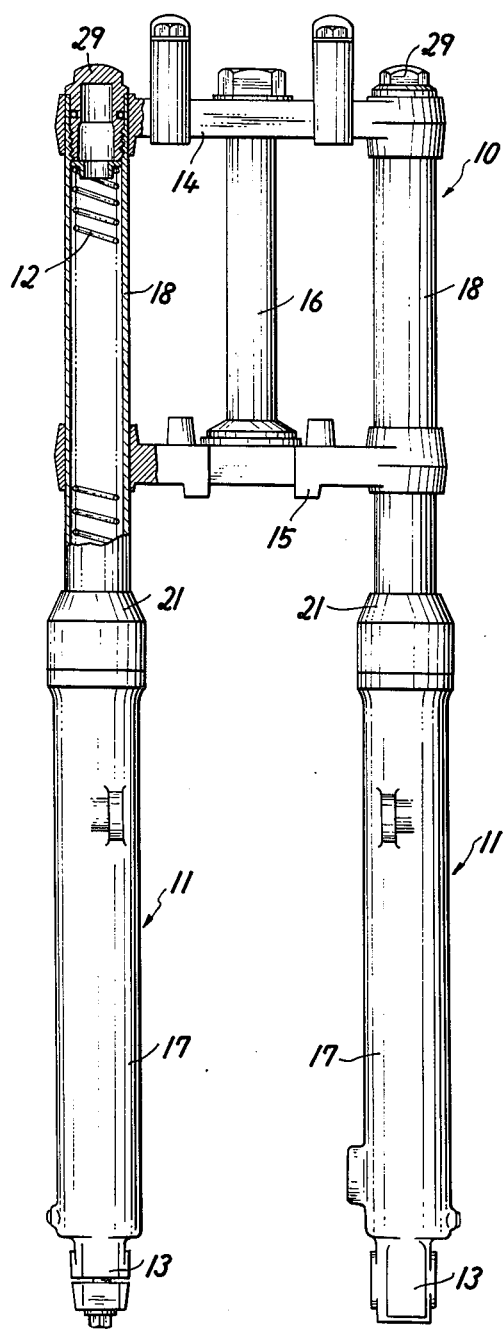
FIG. 1 is a front view, partly in section, of a preferred embodiment of a front fork for a motorcycle embodying the present invention.

Referring now to FIG. 1, there is schematically shown a preferred embodiment of a front fork 10 for suspending a front wheel (not shown) of a motorcycle. The front fork 10 comprises, as is customary, a pair of telescopic hydraulic shock absorbers 11 each having a suspension spring 12 housed therein. The telescopic shock absorbers 11 are formed at the lower ends thereof with axle brackets 13, between which the front wheel is supported. The front fork 10 is rotatably connected to the frame of the motorcycle through a steering shaft 16 extending between upper and lower brackets 14 and 15 which interconnect the telescopic shock absorbers 11 at the upper portions thereof. The front fork 10 thus constructed serves to resiliently suspend the front wheel with respect to the frame by the actions of the suspension springs 12 and reduce the oscillations or jolts of the front wheel caused by the irregularities of the road surface by the actions of the telescopic shock absorbers 11.

Figure 2:
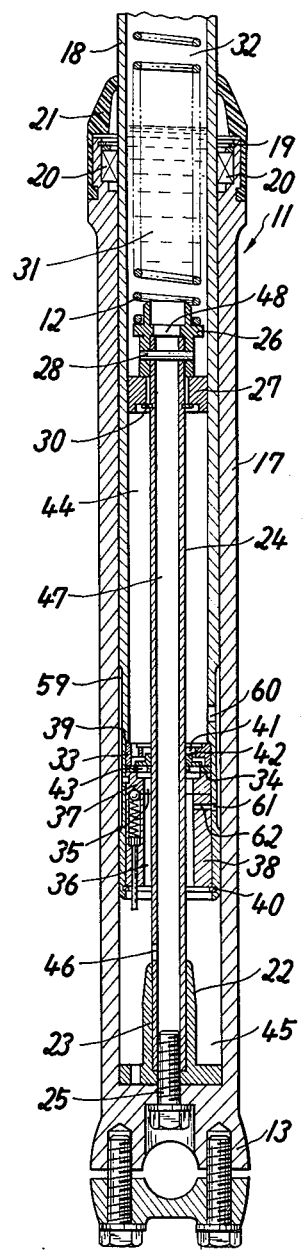
FIG. 2 is a cross sectional view illustrating one of the telescopic hydraulic shock absorbers forming part of the front fork shown in FIG. 1.

As shown in FIG. 2, each of the telescopic shock absorbers 11 is comprised of an outer tube 17 having at its bottom end the axle bracket 13, and an inner tube 18 slidably disposed in the outer tube 17. The inner tube 18 carries at the upper portion thereof the upper and lower brackets 14 and 15 which have been mentioned hereinabove. An oil seal 20 is disposed in the outer tube 17 at the upper portion thereof and fixed in place by a suitable fastening means such as a snap ring 19. In addition, a dust cover or cap 21 is provided on the uppermost end of the outer tube 17. With this arrangement, the inner tube 18 is held in sliding contact with the dust cover 18 and the oil seal 20 so that dust is prevented from entering between the inner and outer tubes and oil leakages therefrom are satisfactorily prevented.

The outer tube 17 is provided at its bottom wall with a lock member 23 having at its upper end a tapered portion 22, into which a lower end of a hollow rod 24 is tightly fitted. The lock member 23 and hollow rod 24 are fixed to the bottom wall of the outer tube 17 by screwably inserting a bolt 25 into the lower end of the hollow rod 24. The hollow rod 24, which vertically extends from the bottom wall of the outer tube 17 into the inner tube 18, carries at its upper portion a spring seat 26 and an auxiliary piston 27. The spring seat 26 is fixed to the hollow rod 24 by a pin 28 and serves to support one end of the suspension spring 12, the other end of which engages with a cap 29 (see FIG. 1) screwed onto the upper end of the inner tube 18. The auxiliary piston 27 is fixedly connected to the upper portion of the hollow rod 24 between the lower end of the spring seat 26 and a snap ring 30 fixed to the hollow rod 24 and has its outer periphery in sliding contact with an inner surface of the inner tube 18 at the upper portion thereof. The working oil accumulating chamber 31 is formed at its upper portion with an air layer 32 to compensate the variations in volume of the working oil accumulating chamber 31 due to inward and outward movements of the inner tube 18 relative to the outer tube 17 during telescopic operation of the front fork 10.

The inner tube 18, which is slidably accommodated in the outer tube 17, is provided (see especially FIG. 3) at its lower portion with a main piston 33, a valve seat 34, and an intermediate annular seat 37 and lock piston 38 formed with bores 35 and 36, respectively, for accommodating the tapered portion 22 of the lock member 23 fixed to the bottom wall of the outer tube 17, which are fixedly held in place between an annular shoulder 39 formed in the inner tube 18 and a snap ring 40 fixed thereto.

Figure 3:
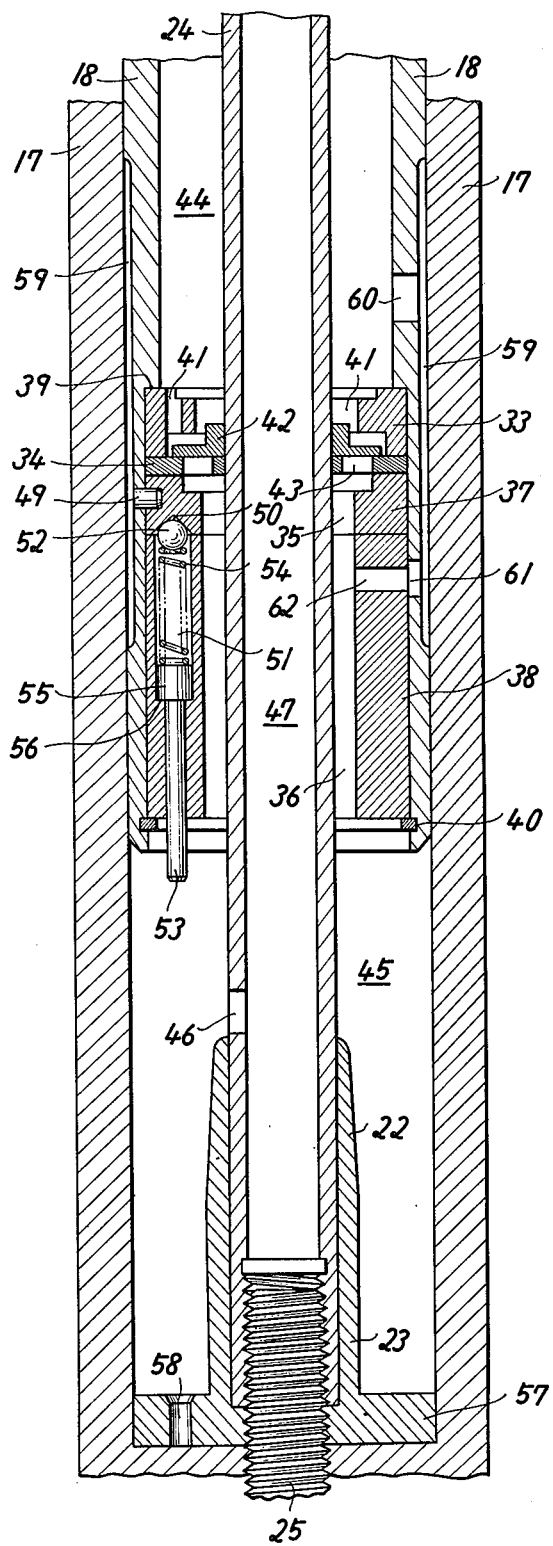
FIG. 3 is an exploded sectional view showing a main piston forming part of the shock absorber shown in FIG. 2.

As best shown in FIG. 3, the main piston 33 is formed with a plurality of axially extending oil passageways 41 and accommodates therein a valve member 42 which is slidably disposed on the outer periphery of the hollow rod 24. The valve seat 34, which is held in contact with the bottom end of the main piston 33, is also formed with a plurality of axially extending bores 43 which are opened or closed by the valve member 42 that is axially movably disposed in the main piston 33. The valve seat 34 and valve member 42 are held in sliding contact with the outer periphery of the hollow rod 24 extending from the bottom wall of the outer tube 17. A pressure chamber 44 is defined between the auxiliary piston 27 (see FIG. 2) mounted on the upper part of the hollow rod 24 and the combination valve member 42 and valve seat 34 while a lower chamber 45 is defined between the same and the bottom wall of the outer tube 17.

As shown in FIG. 2, the lower chamber 45 communicates through a bore 46 formed in the wall of the hollow rod 24, an inner passageway 47 formed therein and a central bore 48 formed in the spring seat 26 mounted on the upper end of the hollow rod 24 with the working oil accumulating chamber 31. With this arrangement, if the inner tube 18 is caused to intrude into the outer tube 17 during compressing stroke of the front fork 10, the lower chamber 45 is reduced in volume with the result that the working oil is forced through the axial bore 36 of the lock piston 38, and the axial bore 35 of the intermediate annular seat 37 into the bore 43 of the valve seat 34, thereby moving the valve member 42 to a position to provide fluid communication between the bore 43 and fluid passageways 41 of the main piston 33 whereby the working oil is forcibly admitted to the pressure chamber 44. Excessive working oil which can not enter the pressure chamber 44 is allowed to flow through the bore 46, inner passageway 47 and central bore 48 of the spring seat 26 into the working oil accumulating chamber 31.

Thus, the front fork 10 performs its compressing stroke without producing a damping effect. During this compressing stroke of the front fork 10, if the inner tube 18 intrudes into the outer tube 17 by a predetermined amount, the lock member 23 of the outer tube 17 moves into the bore 36 of the lock piston 38 provided on bottom end of the inner tube 18 and, thereafter, the working oil in the lower chamber 45 is caused to pass through a gap defined between the bore 36 of the lock piston 38 and the lock member 23 which is varied in effective cross sectional area by the tapered portion 22 of the lock member 23. In this situation, a flowing resistance of the working oil is produced so that the bottom end of the inner tube 18 is prevented from striking against the bottom wall of the outer tube 17.

Figure 4:
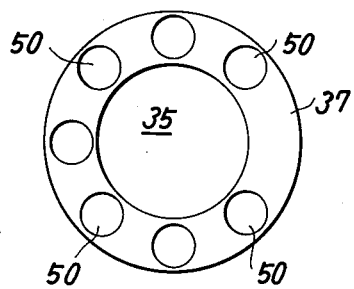
FIG. 4 is a view, looking from the bottom, of an annular seat shown in FIG. 3.

Turning now to FIG. 3, the intermediate annular seat 37 is locked against rotation relative to the inner tube 18 by a pin 49, whereas the lock piston 38 is arranged to be rotatable relative to the inner tube 18. The intermediate annular seat 37 is formed at its bottom wall with a plurality of indents 50 as seen in FIG. 4. The lock piston 38 is formed with an axially extending stepped bore 51, in which a head 55 of an engaging pin 53 and ball 52 are slidably received. The ball 52 is urged upward by the action of a compression spring 54 and brought into engagement with a selected one of the indents 50 of the intermediate annular seat 37. Thus, the indents 50 and the ball 52 serve as a clicking mechanism for restraining the rotation of the lock piston 38 relative to the intermediate annular seat 37. The engaging pin 53 with its head 55 is urged downward by the action of the compression spring 54 so that the head 55 engages with an annular shoulder 56 formed in the lock piston 38 and, in this instance, the lower end of the engaging pin 53 protrudes into the lower chamber 45. In addition, the lock member 23 provided at the bottom wall of the outer tube 17 has an annular flange 57, which is formed with an axially extending bore 58 with which the engaging pin 53 extending from the lock piston 38 is engageable when the inner tube 18 intrudes into the outer tube 17 by a maximum extent. Thus, when the inner tube 18 intrudes into the outer tube 17 by this maximum extent, the lower end of the engaging pin 53 is inserted into the bore 58. If, in this instance, the relative positions of the engaging pin 53 and the bore 58 are out of alignment from each other, the engaging pin 53 abuts against the upper surface of the annular flange 57 and, thereafter, the head 55 of the engaging pin 53 is moved upward in the stepped bore 51 while compressing the spring 54. If, in contrast, the inner and outer tubes 18 and 17 are rotated with respect to each other until the engaging pin 53 is aligned with the bore 58, the engaging pin 53 is caused to intrude into the bore 58 by the action of the spring 54. If, in this condition, the inner and outer tubes 18 and 17 are further rotated relative to each other, the lock piston 38 is angularly shifted relative to the inner tube 18 since the lock piston 38 is locked to the outer tube 17 by means of the engaging pin 53 extending into the bore 58. During this shifting movement of the lock piston 38 relative to the inner tube 18, the ball 52 forming part of the clicking mechanism is caused to engage with each of the indents 50 of the intermediate annular seat 37 and, thus, it is possible to change the angular position of the lock piston 38 relative to the inner tube 18 in dependence on each of the clicking positions of the clicking mechanism.

Figure 5:
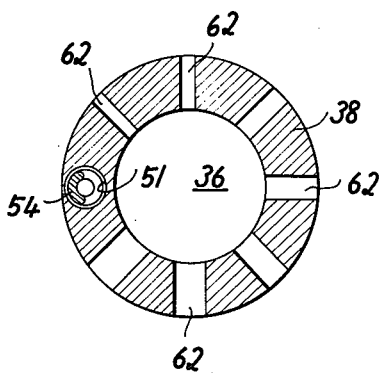
FIG. 5 is a transverse sectional view showing a plurality of orifices formed in a lock piston.

On the other hand, the inner tube 18 is formed at its outer periphery with an annular recess or passage 59 which axially extends between a portion opposing to the upper part of the lock piston 38 and a portion opposing to the lower part of pressure chamber 44. The annular passage 59 communicates at its upper portion with the pressure chamber 44 via a port 60 formed in the inner tube 18 and also communicates at its lower portion with the outer periphery of the lock piston 38 via a port 61 formed in the inner tube 18. As best shown in FIG. 5, the lock piston 38 has a plurality of radially extending orifices 62 of different diameters which are angularly spaced from each other in accordance with each of the clicking positions of the clicking mechanism. With this arrangement, the pressure chamber 44 communicates with the lower chamber 45 of the outer tube 17 through the port 60, annular recess 59 and port 61 via a selected one of the orifices 62 and passageway 36 of the lock piston 38. For this reason, when the inner tube 18 is moved out of the outer tube 17 during the expanding stroke of the front fork 10, the working oil in the pressure chamber 44 is forced into the lower chamber 45 of the outer tube 17 through the port 60, annular recess 59, port 61, a selected one of the orifices 62 and the bore 36 so that a damping effect is produced due to flow resistance of the working oil passing through the orifice 62. During this expanding stroke of the front fork 10, furthermore, the port 60 of the inner tube 18 is shut off by the auxiliary piston 27 mounted on top of the hollow rod 24 so that the pressure chamber 44 is maintained in a sealed or closed condition when the inner tube 18 is moved to its uppermost position whereby the main piston 33 is prevented from striking against the auxiliary piston 27 of the hollow rod 24.

Thus, in accordance with the present invention, the working oil ejecting from the pressure chamber 44 during the expanding stroke of the front fork 10 is allowed to flow into the lower chamber 45 of the outer tube 17 which is located far away from the air layer 32 formed in the upper portion of the inner tube 18 and, hence, the mixing of the working oil and air is satisfactorily avoided. Since, furthermore, the flow of oil is initially supplied by the working oil from the pressure chamber 44 when the lower chamber 45 is increased in volume during the expansion stroke of the front fork 10, the working oil in the working oil accumulating chamber 31 of the inner tube 18 is sucked into the lower chamber 45 via the inner passageway 47 and bore 46 of the hollow rod 24 in an amount corresponding to the difference between the enlarged volume of the lower chamber and the reduced volume of the pressure chamber 44, viz., in an amount corresponding to the volume of a portion of the inner tube 18 moved out of the outer tube 17. Thus, it is possible to prevent the air-bladders or bubbles from being set free from the working oil due to the lack of the working oil sucked into the lower chamber 45 in highly reliable manner. Further, the relative angular position of the inner tube 18 and the outer tube 17 can be adjusted to various positions corresponding to the clicking positions of the clicking mechanism provided between the intermediate annular seat 37 and the lock piston 38, even though the front fork 10 has been completely assembled, by rotating the inner tube and the outer tube relative to each other after the inner tube 18 is caused to intrude into the outer tube 17 by a maximum extent. Thus, the fluid communication between the port 61 of the inner tube 18 and each of the orifices 62 of the lock piston 38 can be easily selected so that the damping effect is adjusted to an optimum value in dependence on the applied conditions on running conditions of the motorcycle.

What is claimed is:

1. A front fork for suspending a front wheel of a motorcycle, comprising
   an outer tube;
   an inner tube slidable within said outer tube;
   means defining adjacent an upper end of said outer tube a working-oil accumulating chamber which contains a body of oil and above the same a body of air, a lower oil chamber adjacent a lower end of said outer tube, and a pressure chamber intermediate said upper and lower chambers and becoming reduced in volume during the expansion stroke of the front fork;
   passage means for providing fluid communication between said chambers, said passage means comprising a passage formed on an outer periphery of said inner tube held in sliding contact with said outer tube, a first port formed in said inner tube for providing fluid communication between said passage and said pressure chamber, a second port formed in said inner tube for providing fluid communication between said passage and an outer periphery of a lock piston disposed on a lower part of said inner tube, and orifices formed in said lock piston and communicable with said second port for providing said damping effect;
   orifice means in said passage means for providing a damping effect;
   means for varying the effective cross-sectional area of said orifice means for thereby adjusting said damping effect; and
   means for preventing working oil which is expelled from said pressure chamber into said lower chamber during the expansion stroke of said front fork from becoming mixed with air from said layer in said upper chamber, said means for preventing working oil comprising a hollow rod fitted to a bottom wall of said outer tube and extending upwardly into the inner tube and carrying at an upper end an auxilary piston, said auxilary piston separating said accumulating chamber from said pressure chamber, said hollow rod providing fluid communication between said accumulating chamber and said lower chamber.

2. A front fork according to claim 1, in which said orifices comprise a plurality of radially extending orifices of different diameters communicable with said second port, in which said lock piston is rotatably disposed in said inner tube and has an engaging member protruding from the bottom surface of said lock piston downward, and in which said outer tube is provided with a bore with which said engaging member is engageable when said inner tube intrudes into said outer tube by a maximum extent.

3. A front fork according to claim 2, further comprising a clicking mechanism provided between said lock piston and an intermediate annular seat fixed to said inner tube at an upper part of said lock piston, said clicking mechanism having a plurality of clicking positions in each of which a selected one of said orifices formed in said lock piston communicates with said second port of said inner tube.

* * * * *